United States Patent [19]

Pitzo

[11] Patent Number: 5,039,047
[45] Date of Patent: Aug. 13, 1991

[54] MAGNETIC WALL MOUNTING DEVICE
[75] Inventor: Charles Pitzo, Columbus, N.J.
[73] Assignee: Childhood Friends, Inc., Columbus, N.J.
[21] Appl. No.: 346,071
[22] Filed: May 2, 1989
[51] Int. Cl.⁵ ............................................. A47G 1/17
[52] U.S. Cl. ............................ 248/206.5; 248/309.4; 248/467
[58] Field of Search ............... 248/206.5, 205.3, 309.4, 248/224.3, 467, 475.1, 684, 214; 211/DIG. 1; 40/600

[56] References Cited

U.S. PATENT DOCUMENTS

| | | | |
|---|---|---|---|
| 2,549,766 | 4/1951 | Benson | 248/205.3 X |
| 3,365,684 | 1/1968 | Stemke et al. | 335/302 |
| 3,604,673 | 9/1971 | Klein | 248/467 |
| 3,713,614 | 1/1973 | Taylor | 248/205 A |
| 3,827,020 | 7/1974 | Okamoto | 335/285 |
| 4,100,684 | 7/1978 | Berger | 35/62 |
| 4,287,676 | 9/1981 | Weinhaus | 40/600 X |
| 4,605,292 | 8/1986 | McIntosh | 350/641 |
| 4,609,173 | 9/1986 | Belokin | 248/225.1 |
| 4,678,150 | 7/1987 | Newman | 248/467 X |

FOREIGN PATENT DOCUMENTS 2158385 5/1973 Fed. Rep. of Germany ... 248/475.1

Primary Examiner—J. Franklin Foss
Attorney, Agent, or Firm—Peter J. Cronk

[57] ABSTRACT

Multipurpose magnetic mounting devices and methods for their use are provided by this invention. The device includes a male member having first and second transverse ends and comprising adhesive means for attachment to a first of a pair of surfaces, such as a picture frame. The device further includes a female member having an open cavity therein for receiving the second transverse end of the male member. The female member includes adhesive means for attachment to a second of a pair of surfaces, such as a wall. The invention relies upon the magnetic attraction between the male and female members for holding the device together and adhering a pair of surfaces of one another.

9 Claims, 1 Drawing Sheet

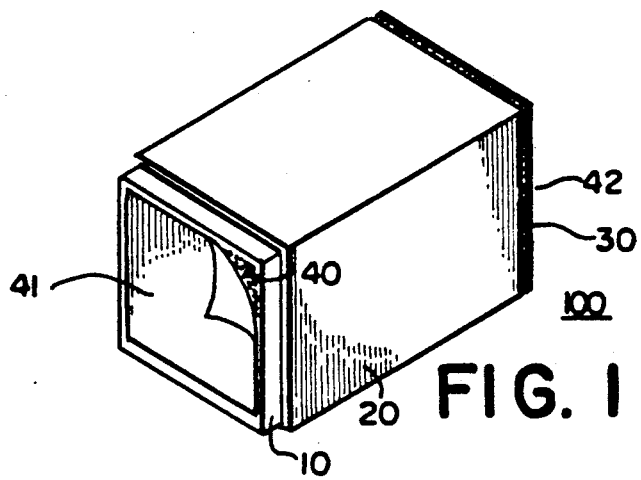
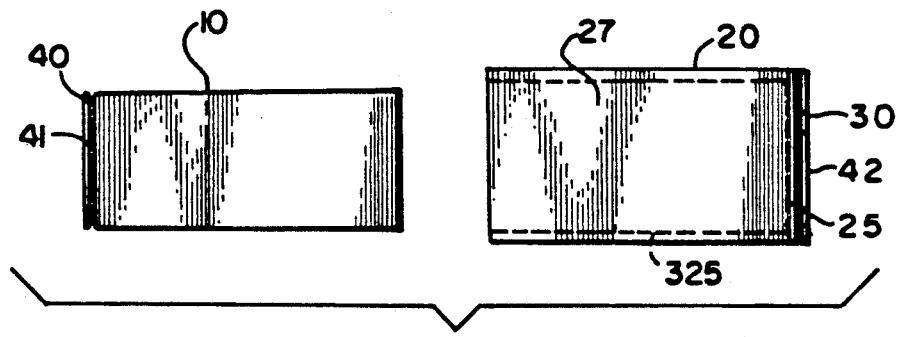
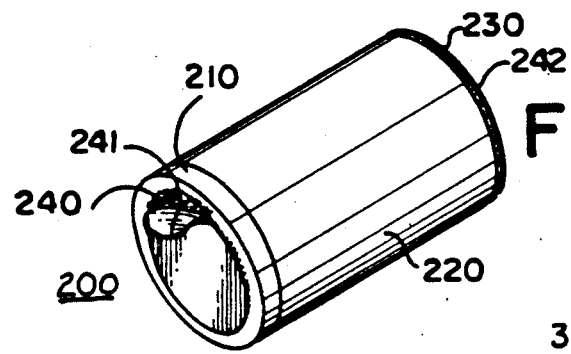
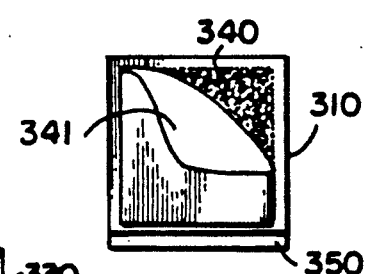
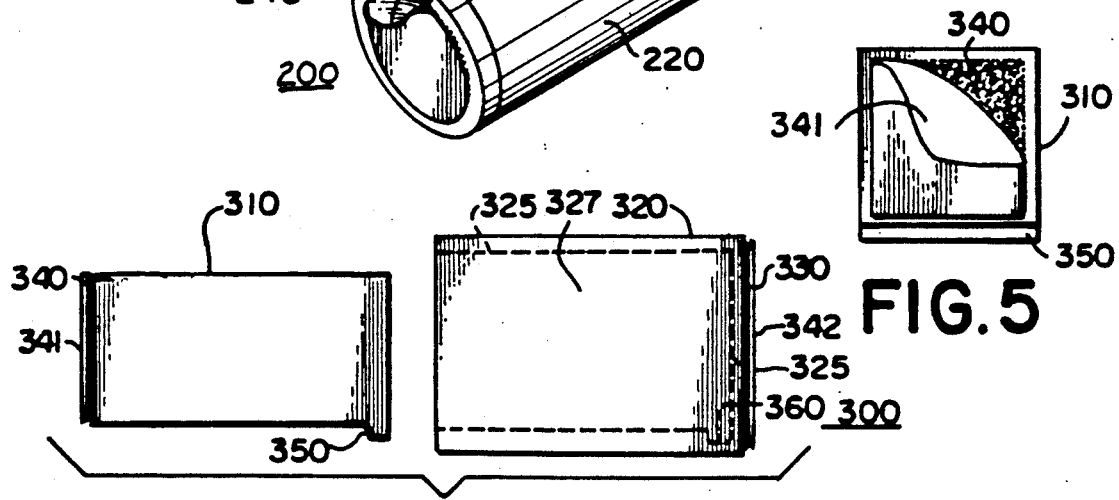

MAGNETIC WALL MOUNTING DEVICE

FIELD OF THE INVENTION

This invention relates to methods of securing pairs of surfaces to one another, and particularly to providing efficient means for temporarily securing objects to surfaces, such as pictures to walls.

BACKGROUND OF THE INVENTION

Picture frames and decorations are often attached to walls using tacks or small nails. This generally produces small holes in plaster or dry wall and increases the wear and tear of commercial and residential buildings. Adhesive strips have alternatively been used for securing articles to walls, but these are generally limited to single application uses.

The art has been replete with retaining and holding mechanisms for mounting various individual articles to walls. Yet none of these references has provided a sufficient suggestion to those of ordinary skill for improving the state of the art in multipurpose wall hanging mechanisms.

Taylor, U.S. Pat. No. 3,713,614, Jan. 30, 1973, relates to a flashlight holder which comprises a permanent magnetic on a flashlight body and a magnetically attractable bracket having a base with a resilient pad and an adhesive backing adapted to adhere the bracket to a wall surface.

Stemke et al., U.S. Pat. No. 3,365,684, Jan. 23, 1968, discloses magnetic elements for mounting the loose end of shower curtains on an adjacent bath area. The magnetic elements are mounted in spaced relation on a side wall in a substantially vertical line between the top and bottom edges of an associated flexible shower curtain. The retaining means uses snap fasteners which secure the shower curtain and adhere the shower curtain to soft magnetic material which in turn can be adhered to a ceramic magnet attached to the shower wall.

Okamoto, U.S. Pat. No. 3,827,020, July 30, 1974, discloses a universal holding device for securing memorandum pads and paper sheets and the like on a supporting wall. This patent discloses the use of an adhesively secured magnetic element disposed within a flat coupling unit and a second magnetic element having the opposite polarity of the first magnetic unit for "sandwiching" paper or the like between the magnetic units.

Berger, U.S. Pat. No. 4,100,684, July 18, 1978, discloses a holding device for paper articles and writing instruments comprising a housing having a pair of compartments therein. A permanent magnetic is mounted on the housing and is removably received on a metallic bar which is adhesively mounted on a wall surface. This reference also discloses the use of release strips on the adhesive layer for protecting the adhesive layer prior to use.

McIntosh, U.S. Pat. No. 4,605,292, Aug. 12, 1986, discloses a mirror which can be mounted to a surface via a magnetic adhesively bonded support.

Belokin, U.S. Pat. No. 4,609,173, Sept. 2, 1986, discloses a magnetically attachable towel hanger including a hanger member having a male protrusion and an elongated, strip-like, one-piece supporting member of elastomeric material impregnated with a magnetized material for receiving the male hanger member.

While in the main, these support mechanisms are illustrative of the current state of the art in magnetic and adhesive supporting devices for limited uses, there remains a need for simplified multipurpose holding mechanisms for overcoming the current deficiencies associated with tack nails and adhesive wall-mounting strips.

SUMMARY OF THE INVENTION

In accordance with the teachings of this invention, improved multipurpose magnetic mounting devices and methods for their use are provided. The magnetic wall mounting devices of this invention includes a male member, having adhesive means for attachment to a first surface, and a female member having an open cavity for receiving the male member. The female member also includes adhesive means for attachment to a second surface, such as a wall. This invention further includes magnetic means in at least one of the male and female members for magnetically attracting the male and female members together.

The method of this invention includes providing the magnetic mounting device, as described, securing the female member to a first surface with adhesive and then securing the male member to another surface with adhesive. The surfaces are then mounted together by inserting the male member into the female member, whereby the male and female member are magnetically attracted to one another. Thus, a plurality of the devices could be employed in this fashion to mount a painting to a wall, etc.

The enumerated devices and methods are extremely versatile. Wall decorations and framed articles can be attached to metal doors with relative ease. Advertising literature can be mounted to chalkboards or glass without damage. The magnetic coupling provides for facilitated releasing of the mounting device for interchangability of articles and locations.

It is, therefore, an object of this invention to provide an inexpensive and versatile replacement for tacks and adhesive strips for hanging articles.

It is another object of this invention to provide a magnetic mounting device which provides a space between a mounted article and a wall for disposing electrical wires and the like behind a mounted article.

With these and other objects in view, this invention resides in the novel construction, combination, arrangement of parts and methods substantially as herein after described and more particularly defined by the attached claims.

BRIEF DESCRIPTION OF THE DRAWINGS

The accompanying drawings illustrate a complete embodiment of the invention according to the best mode so far devised for the practical application of the principles thereof, and in which:

FIG. 1: is a perspective view of a preferred magnetic wall mounting device illustrating a relatively square cross-section;

FIG. 2: is a side, exploded view, of the magnetic wall mounting device embodiment of FIG. 1;

FIG. 3: is another preferred embodiment for the magnetic wall mounting device of this invention including a generally circular cross-section;

FIG. 4: is an exploded view of another preferred magnetic wall mounting device illustrating a mechanical securement means comprising a recess in an inner wall of the metallic female member and a protruding portion on the magnetic male member; and FIG. 5: is a front end view of the male member of the magnetic wall mounting device of FIG. 4.

DETAILED DESCRIPTION OF THE INVENTION

The preferred operable embodiments of this invention will now be discussed. In a first embodiment, a multipurpose magnetic wall mounting device is provided for securing a pair of surfaces to one another, such as a picture to a wall. The device includes a male member having first and second transverse ends, the first transverse end comprising adhesive means for attachment to a first of the pair of surfaces. The device further includes a female member having an open cavity therein for receiving the second transverse end of the male member. The female member includes adhesive means for attachment to a second of a pair of surfaces. At least one of the male and female members of this embodiment includes magnetic means for magnetically attracting the male and female members together.

In an alternative embodiment of this invention, a magnetic wall mounting device is provided which includes a magnetic male member having first and second transverse ends wherein the first transverse end comprises adhesive means for attachment to a first of a pair of surfaces. The device further includes a steel female member having a open cavity therein for snugly receiving, e.g., providing a clearance of less than about 0.05 inches, substantially all of the periphery of the second transverse end of the male member. An used herein the term "entire periphery" refers to the measurement of the circumference or outer dimension of the cross-section of the second transverse end, whereby the circumference or outer dimension lies in a plane which is generally parallel to the surfaces to be attached by the device. In accordance with this invention, the female member also comprises adhesive means for attachment to a second of the pair of surfaces.

With reference to the figures and particularly FIGS. 1 and 2, there is shown in perspective and exploded view a preferred magnetic wall mounting device 100 of this invention. The preferred device 100 includes a generally square cross-section for the female member 20 and male member 10. The male member comprises first and second transverse ends, the first transverse end including adhesive means, or adhesive strip 40, for attachment to a first of a pair of surfaces, such as a framed picture.

The device 100 further includes a female member 20 having an open cavity 27 therein for receiving the second transverse end of the male member 10. The female member comprises adhesive means, such as adhesive strip 30 for attachment to a second of the pair of surfaces, such as a wall. This embodiment preferably employs the magnetic properties of a permanent magnet for use as the material for manufacturing the male member 10. This effectively creates a magnetic means for magnetically attracting the male and female members together. It is therefore preferred that the female member contain iron, preferably a low carbon steel, which can be inexpensively fabricated.

As illustrated in FIG. 3, the magnetic wall mounting device of this invention can include a generally round or circular cross-section. In the embodiment 200, the male and female members 210 and 220 can further include adhesive mean such a strip 240 and 230 respectively.

Referring now to the embodiment described by FIGS. 4 and 5, there is shown an alternative magnetic wall mounting device 300 which further includes mechanical securement means for providing resistance to separation of the metallic female member 320 and the magnetic male member 310 when the members are connected. Although the mechanical securement means can take the form of a myriad of interlocking mechanisms, the embodiment 300 includes a recess 360 within the inner wall 325 of the metallic female member 320, which cooperates with a protruding portion 350 of the female member 210. Preferably, the protruding portion 350 extends outwardly about 0.05 to 0.02 inches from the longitudinal side of the male member 210. The protruding portion 350 should be readily inserted into the recess 360 when the male member 310 is inserted into the cavity 327 of the female member 320. Accordingly, it is preferred that the cavity 27 have sufficient height for permitting the easy insertion of the male member 310 with its protrusion 350. Thus, in the embodiment 300, the securement of an article to a wall can be guaranteed by both a magnetic connection and a mechanical connection which, in combination, provide added security for wall hanging. The embodiment 300 can also include adhesive elements 330 and 340 for securing to a pair of surfaces.

The material selection for the individual elements of the devices of this invention will now be explained in some detail. As used herein "a substantial portion" of any element comprises over 90 wt. % of that element. In the preferred embodiments, the magnetic means, preferably male members 10, 210 and 310, are manufactured using magnetic materials. Preferably these include inexpensive soft magnets, e.g., low-carbon steels, the silicon-iron electrical steels, iron-nickel and iron-cobalt alloys, ferrites, and garnets. Alternatively the magnetic materials can include permanent magnet materials employing large coercivity along larger hysteresis loops. These can include for example, steels, precipitation alloys, cold deformation hardened alloys, superstructure alloys, dust magnets, ceramic magnets, and material exhibiting exchange anisotropy. Reference can be made to Metals Handbook, 9th ed., "Metallography and Microstructures", Vol. 9, pp. 531-539 (1985), which is hereby incorporated by reference.

The female members of this invention 20, 220 and 320 can include both magnetic or materials attracted to the male member material. Preferably the female members 20, 220 and 320 include mild steel or other iron-based products, such as some stainless steel classifications which are attracted to iron magnets.

The adhesive elements of this invention 30, 230, 330, 40, 240, and 340 are preferably those selected from known pressure-sensitive adhesive materials. Adhesive compositions suitable for these adhesive elements can include water-based pressure-sensitive adhesives, such as acrylate adhesives. Additionally, rapid setting thermoplastic hot melt, rubber adhesives can be equally employed. In order to protect these adhesive elements prior to use, kraft paper releasable strips 41, 42, 241, 242, and 341, 342, preferably with silicon treated surfaces, can be applied over the adhesive elements.

From the foregoing, it can be released that this invention provides facilitated magnetic mounting devices and methods for their use. The devices enumerated in the following claims provide interchangability between male and female members for moving the location of hanging articles. In addition, preferred embodiments of this device include mechanical securement means for increasing the reliability of securement. Although various embodiments have been illustrated, this was for the purpose of describing, but not limiting the invention. Various modifications, which will become apparent to one skilled in the art, are within the scope of this invention described in the attached claims.

I claim:

1. A releasable multipurpose magnetic mounting device for securing a pair of surfaces to one another, such as a picture to a wall, comprising:
   (a) a male member having first and second transverse ends, said first transverse end comprising first pressure-sensitive adhesive means for releasable attachment to a first of said pair of surfaces;
   (b) a female member having an open cavity therein for receiving said second transverse end of said male member, said female member comprising, second pressure-sensitive adhesive means for releasable attachment to a second of said pair of surfaces; at least one of said male and female members comprising magnetic means for magnetically attracting said female and male members together to provide a transverse dimension for said device which is less than about a distance between said first and second pressure-sensitive adhesive means.

2. The device of claim 1 wherein said cavity of said female member comprises a generally square cross section.

3. The device of claim 1 wherein said cavity of said female member comprises a generally round cross section.

4. The device of claim 1 wherein a substantial portion of said female member comprises steel.

5. The device of claim 1 wherein a substantial portion of said male member comprises soft magnetic material.

6. The device of claim 1 further comprising mechanical securement means for providing resistance to separation of said magnetic female member and said magnetic male member when said members are connected.

7. The device of claim 6 wherein said mechanical securement means comprises a recess within an inner wall of said female member.

8. The device of claim 7 wherein said mechanical securement means comprises a protruding portion of said male member.

9. A method of magnetically mounting a pair of surfaces to one another, such as a picture to a wall, comprising:
   (a) providing a magnetic mounting device comprising a male member having first and second transverse ends, said first transverse end comprising first pressure-sensitive releasable adhesive means for attachment to a first of said pair of surfaces, a female member having an open cavity therein for receiving said male member, said female member comprising second pressure-sensitive adhesive means for releasable attachment to a second of said pair of surfaces, and magnetic means for magnetically attracting said female and male members together;
   (b) securing said female member to said second surface with said second pressure-sensitive adhesive means;
   (c) securing said male member to said first surface with said first pressure-sensitive means;
   (d) inserting said male member into said female member, whereby said male and female member are magnetically attracted to one another and provide a transverse dimension which is less than about a distance between said first and second pressure-sensitive adhesive means.

* * * * *